(12) United States Patent
Krone et al.

(10) Patent No.: US 12,017,699 B2
(45) Date of Patent: Jun. 25, 2024

(54) SYSTEM FOR DETECTING FAILURE OF AN ACKERMAN-TYPE STEERING MECHANISM

(71) Applicant: Caterpillar Inc., Peoria, IL (US)

(72) Inventors: John James Krone, Peoria, IL (US); Daniel Peter Sergison, East Peoria, IL (US); Edward William Mate, Manhattan, IL (US); Jeremy T. Peterson, Washington, IL (US); Bradly Glen Duffer, East Peoria, IL (US); Matthew Stephen Marquette, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 687 days.

(21) Appl. No.: 17/180,321

(22) Filed: Feb. 19, 2021

(65) Prior Publication Data

US 2022/0266905 A1    Aug. 25, 2022

(51) Int. Cl.
*B62D 15/02* (2006.01)
*B62D 5/06* (2006.01)
(Continued)

(52) U.S. Cl.
CPC ......... *B62D 15/0225* (2013.01); *B62D 5/062* (2013.01); *B62D 5/12* (2013.01);
(Continued)

(58) Field of Classification Search
CPC .. B62D 15/021; B62D 15/0225; B62D 15/03; B62D 15/02; B62D 5/062; B62D 5/06;
(Continued)

(56) References Cited

U.S. PATENT DOCUMENTS 5,653,304 A * 8/1997 Renfroe ................ B62D 6/002
                                                         701/41
5,725,063 A    3/1998 Ceragioli et al.
(Continued)

FOREIGN PATENT DOCUMENTS

CN      105480299           4/2016
CN      106926898 A         7/2017
(Continued)

OTHER PUBLICATIONS

Written Opinion and International Search Report for Int'l. Patent Appln. No. PCT/US2022/016088, dated May 3, 2022 (12 pgs).
(Continued)

*Primary Examiner* — Keith J Frisby

(57) ABSTRACT

A machine includes a frame, a first steering arm, a second steering arm, a first hydraulic actuator coupled to the frame and the first steering arm, and a second hydraulic actuator coupled to the frame and the second steering arm. A first angle sensor measures a rotational displacement of the first hydraulic actuator relative to the first steering arm. A first link couples the first hydraulic actuator and the first sensor, and isolates movements other than the first rotational displacement. A second angle sensor measures a second rotational displacement of the second hydraulic actuator relative to the second steering arm. A second link couples the second hydraulic actuator and the second sensor, and isolates movements other than the second rotational displacement.

20 Claims, 6 Drawing Sheets

(51) Int. Cl.
    *B62D 5/12*    (2006.01)
    *B62D 7/06*    (2006.01)
    *B62D 7/16*    (2006.01)
    *B62D 7/18*    (2006.01)

(52) U.S. Cl.
    CPC ............... *B62D 7/06* (2013.01); *B62D 7/16* (2013.01); *B62D 7/18* (2013.01); *B62D 15/021* (2013.01); *B62D 7/166* (2013.01)

(58) Field of Classification Search
    CPC .......... B62D 5/0481; B62D 5/12; B62D 7/06; B62D 7/18; B62D 7/166; B62D 7/16; B62D 6/002
    USPC ...................................................... 280/93.5
    See application file for complete search history.

(56) References Cited

U.S. PATENT DOCUMENTS

| | | | |
|---|---|---|---|
| 5,908,081 | A | 6/1999 | Olson |
| 6,039,133 | A | 3/2000 | Zulu |
| 6,047,229 | A | 4/2000 | Ishikawa |
| 6,293,022 | B1 | 9/2001 | Chino et al. |
| 6,848,254 | B2 | 2/2005 | Du |
| 7,896,125 | B2 | 3/2011 | Ivantysynova et al. |
| 8,825,295 | B2 | 9/2014 | Turner |
| 9,272,729 | B2 | 3/2016 | Minoshima et al. |
| 10,266,200 | B2 | 4/2019 | Takenaka et al. |
| 10,654,522 | B2 | 5/2020 | Carter |
| 10,865,543 | B2 | 12/2020 | Takenaka et al. |
| 2002/0175009 | A1* | 11/2002 | Kress ................ B62D 7/04 180/199 |
| 2005/0092540 | A1 | 5/2005 | Saarinen et al. |
| 2007/0001416 | A1 | 1/2007 | Freytag |
| 2012/0317846 | A1 | 12/2012 | Audet |
| 2013/0039729 | A1 | 2/2013 | Landoll et al. |
| 2014/0367189 | A1 | 12/2014 | Minoshima |
| 2015/0137471 | A1* | 5/2015 | Smith ................ B62D 9/00 280/93.502 |
| 2018/0170369 | A1 | 6/2018 | Mitchell et al. |
| 2020/0025550 | A1 | 1/2020 | Utermoehlen et al. |
| 2020/0055544 | A1 | 2/2020 | Veasy et al. |
| 2020/0223476 | A1 | 7/2020 | Mate et al. |
| 2021/0339799 | A1* | 11/2021 | Tonini ................ B62D 15/023 |
| 2022/0266905 | A1 | 8/2022 | Krone et al. |

FOREIGN PATENT DOCUMENTS

| | | |
|---|---|---|
| CN | 105857393 B | 11/2017 |
| CN | 109625080 | 7/2020 |
| CN | 111483522 | 8/2020 |
| DE | 10103404 A1 | 8/2002 |
| EP | 2840012 B1 | 2/2015 |

OTHER PUBLICATIONS

Written Opinion and International Search Report for Int'l. Patent Appln. No. PCT/US2022/016252, dated May 20, 2022 (13 pgs).
Non-final Office Action dated Dec. 23, 2022 for U.S. Appl. No. 17/180,269 "System for Detecting Failure of an Articulated Steering Mechanism" Krone, J. 9 pages.

* cited by examiner

SYSTEM FOR DETECTING FAILURE OF AN ACKERMAN-TYPE STEERING MECHANISM

TECHNICAL FIELD

The present disclosure relates to a system sensor for measuring a steering angle of a machine. More specifically, the present disclosure relates to a system for measuring steering angles for use in determining a failure of a steering assembly of the machine.

BACKGROUND

Machines, such as mining trucks, loaders, dozers, or other construction and mining equipment, are frequently used for building, construction, mining, and other activities. For example, mining trucks are often used for hauling mined materials from mining sites. These machines have steering assemblies that include tie rods, arms, hydraulic cylinders, mechanical linkages, and so forth. While steering assemblies are designed to avoid failure, in heavy-duty applications, long service wear, lack of maintenance, and/or abuse usage may cause failures.

To detect faults, the steering assemblies, or components thereof, may include sensors. In some instances, the sensors may measure steering angles of the machine to determine whether the steering angles are within certain ranges. Steering angles that are outside of the ranges may indicate failure. However, conventionally, sensors are located internal to components of the steering assembly, such as the hydraulic cylinders. The location of the sensors makes replacement of the sensors and/or hydraulic cylinders difficult as well as time consuming. Additionally, sensors located within the hydraulic cylinders increases manufacturing and repair costs.

One mechanism for measuring a steering angle is described in U.S. Pat. No. 10,266,200 (hereinafter referred to as "the '200 reference"). The '200 reference describes steering cylinders with cylinder stroke sensors for detecting the stroke of the cylinders, respectively. Sensed values from these cylinder stroke sensors may be used to find the steering angles. However, the cylinder stroke sensors described in the '200 reference are integral to the steering cylinders. This increases effort and downtime when repairing the sensors, and/or requires replacement of the entire steering cylinder.

Examples of the present disclosure are directed toward overcoming one or more of the deficiencies noted above.

SUMMARY

According to a first aspect, a machine may include a first steering arm coupled to a first wheel of the machine, a second steering arm coupled to a second wheel of the machine, a first cylinder extending between the first steering arm and a frame of the machine, and a second cylinder extending between the second steering arm and the frame. Actuation of the first cylinder may cause a first rotation of the first cylinder relative to the frame about a first rotational axis and actuation of the second cylinder may cause a second rotation of the second cylinder relative to the frame about a second rotational axis. The machine may further include a first angle sensor configured to sense a first angular displacement corresponding to the first rotation and a second angle sensor configured to sense a second angular displacement corresponding to the second rotation.

According to a further aspect, a steering assembly may include a frame, a first steering arm, a second steering arm, a first hydraulic actuator coupled to the frame and to the first steering arm, and a second hydraulic actuator coupled to the frame to the second steering arm. Actuation of the first hydraulic actuator causes the first steering arm to pivot relative to the frame and relative to the first steering arm, and actuation of the second hydraulic actuator causes the second steering arm to pivot relative to the frame and relative to the second steering arm. The steering assembly may further include a first angle sensor disposed to measure a first rotational displacement of the first hydraulic actuator relative to the first steering arm, a first link coupled at a first end to the first hydraulic actuator and coupled at a second end to the first angle sensor, the first end of the first link being moveable relative to the second end of the first link to isolate movements other than the first rotational displacement. The steering assembly may further include a second angle sensor disposed to measure a second rotational displacement of the second hydraulic actuator relative to the second steering arm, and a second link coupled at a third end to the second hydraulic actuator and coupled at a fourth end to the second angle sensor, the third end of the second link being moveable relative to the fourth end of the second link to isolate movements other than the second rotational displacement.

According to a further aspect, a machine may include a frame, a first steering arm coupled to a first wheel of the machine, a second steering arm coupled to a second wheel of the machine, a first actuator coupled to a first side of the frame and the first steering arm, and a second actuator coupled to a second side of the frame and the second steering arm. The machine may further include a first sensor configured to sense a first angular displacement associated with the first actuator, a first isolating mechanism coupled to the first actuator and configured to rotate in response to an actuation of the first actuator. Rotation of the first isolating mechanism may be sensed by the first sensor as the first angular displacement. The machine may further include a second sensor configured to sense a second angular displacement associated with the second actuator, and a second isolating mechanism coupled to the second actuator and configured to rotate in response to an actuation of the second actuator. Rotation of the second isolating mechanism may be sensed by the second sensor as the second angular displacement.

BRIEF DESCRIPTION OF THE FIGURES

The present disclosure is set forth with reference to the accompanying figures. In the figures, the left-most digit(s) of a reference number identifies the figure in which the reference number first appears. The use of the same reference numbers in different figures indicates similar or identical items. Furthermore, the figures may be considered as providing an approximate depiction of the relative sizes of the individual components within individual figures. However, the representations within the figures are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Figure 1:
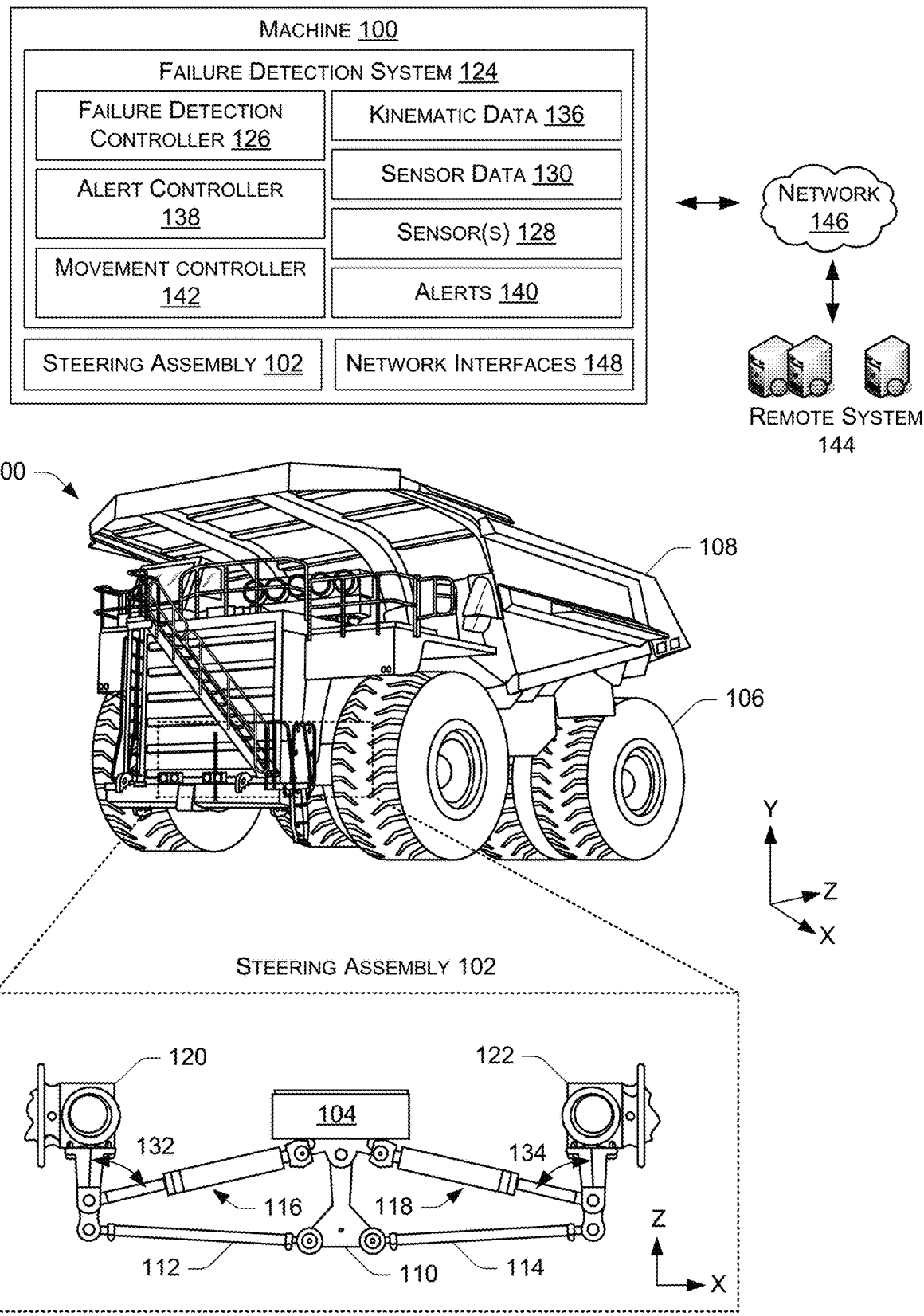
FIG. 1 illustrates an example machine including an example steering assembly for determining steering angles of the machine, according to an embodiment of the present disclosure.

FIG. 1 is a schematic illustration of an example machine 100 with an example steering assembly 102, in accordance with examples of the disclosure. Although the machine 100 is depicted as a type of haul truck, the machine 100 may include any suitable machine, such as any type of loader, dozer, dump truck, compaction machine, backhoe, combine, scrapers, trencher, tractor, combinations thereof, or the like. In some instances, the machine 100 is configured, for example, for moving paving materials (e.g., asphalt), mined materials, soil, overburden, heavy construction materials, and/or equipment for road construction, building construction, other mining, paving and/or construction applications. For example, the machine 100 may be used in instances where materials, such as mineral ores, loose stone, gravel, soil, sand, concrete, and/or other materials of a worksite need to be transported at a worksite.

The machine 100 includes a frame 104 and wheels 106. The frame 104 is constructed from any suitable materials, such as iron, steel, aluminum, or other metals. The frame 104 is of a unibody construction in some cases, and in other cases, is constructed by joining two or more separate body pieces. Parts, or components, of the frame 104 are joined by any suitable variety of mechanisms, including, for example, welding, bolts, screws, fasteners, or the link.

The wheels 106 are mechanically coupled to a drive train (not shown) to propel the machine 100. The machine 100 includes an engine that is of any suitable type, size, power output, etc. In some instances, the engine may be gas-powered (e.g., diesel), natural gas powered, solar powered, or battery powered. When the engine is powered, the engine causes the wheels 106 to rotate, via the drive train, to enable the machine 100 to traverse an environment. As such, the engine is mechanically coupled to a variety of drive train components, such as a drive shaft and/or axles, to rotate the wheels 106 and propel the machine 100. In some instances, the drive train includes any variety of other components including, but not limited to a differential, connector(s), constant velocity (CV) joints, etc.

As shown, the machine 100 may be configured to carry material in a dump box 108 or other moveable element(s) configured to move, lift, carry, and/or dump materials. The dump box 108 is actuated by one or more hydraulic systems, or any other suitable mechanical system of the machine 100. In some instances, the hydraulic system is powered by the engine, such as by powering hydraulic pump(s) (not shown) of the hydraulic system. However, it should be noted that in other types of machines (e.g., machines other than a mining truck) the hydraulic system may be in a different configuration than the one shown in FIG. 1, may be used to operate element(s) other than a dump box 108, and/or may be omitted.

In some instances, the machine 100 may include a cabin or other such operator station. The operator station is configured to seat an operator (not shown) therein. The operator seated in the operator station interacts with various control interfaces and/or actuators (e.g., steering wheel, levers, buttons, joysticks, etc.) within the operator station to control movement of the machine 100 and/or various components of the machine 100, such as raising and lowering the dump box 108. Additionally, or alternatively, in some instances, and as discussed herein, the machine 100 may be remotely controlled by a remote operator or autonomously. For example, the machine 100 may operate autonomously along a predetermined path or route within an environment. In such instances, the machine 100 may include the operator station, or the operator station may be omitted. Further, the machine 100 may be remote controlled even in instances where an operator is positioned within the operator station.

The steering assembly 102 may include components for permitting steering of the machine 100. In FIG. 1, a detailed view of the steering assembly 102 is shown. In some instances, the steering assembly 102 may include a center link 110, a first tie rod 112, a second tie rod 114, a first cylinder rod 116, and a second cylinder rod 118. The first tie rod 112 and the second tie rod 114 may include ends that are pivotably coupled to the center link 110 (e.g., ball joint, knuckle joint, etc.). For example, the first tie rod 112 and the second tie rod 114 may pivotably couple to the center link 110 via a pin disposed through the first tie rod 112 and the center link 110, and the second tie rod 114 and the center link 110. Bearings, knuckles, or other joints may also be included to permit pivotable movement of the first tie rod 112 and the second tie rod 114 relative to the center link 110 (e.g., as the machine 100 traverses terrain, steers, and so forth). However, although the steering assembly 102 is shown including certain components, Ackerman-type steering assemblies may include additional or different components than illustrated and discussed herein.

Opposing ends of the first tie rod 112 and the second tie rod 114 not coupled to the center link 110 couple to steering arms of the machine 100. For example, the machine 100 may include a first steering arm 120 located at a first side of the machine 100 (e.g., right hand side) and a second steering arm 122 located at a second side of the machine 100 (e.g., left hand side). The first tie rod 112 and the second tie rod 114 may couple to the first steering arm 120 and the second steering arm 122, respectively (e.g., via pins). The pins may permit pivotable or rotational movement of the first tie rod 112 and the second tie rod 114 relative to the first steering arm 120 and the second steering arm 122, respectively. Bearings, knuckles, or other joints may permit pivotable movement of the first tie rod 112 and the second tie rod 114 as the first steering arm 120 and the second steering arm 122 rotate, respectively, or as the machine 100 traverses terrain, steers, and so forth. The first steering arm 120 may also couple to a first wheel (e.g., at a hub) of the wheels 106 located on the first side of the machine 100, and the second steering arm 122 may couple to a second wheel (e.g., at a hub) of the wheels 106 located on the second side of the machine 100.

The first cylinder rod 116 may pivotably couple to the first steering arm 120 and the second cylinder rod 118 may pivotably couple to the second steering arm 122. The first cylinder rod 116 and the second cylinder rod 118 may couple to the first steering arm 120 and the second steering arm 122, respectively, via pins and bearings (e.g., knuckles). In some instances, the first cylinder rod 116 and the second cylinder rod 118 may represent linear actuators that extend and retract to various lengths upon actuation of a steering mechanism of the machine 100. For example, when a steering mechanism, such as a steering wheel, (not shown) is actuated (e.g., turned) by an operator of the machine 100 (or by a remote operator) to indicate a desired movement of the machine 100, a controller may generate and transmit an associated control signal to the first cylinder rod 116 and the second cylinder rod 118. In response, the first cylinder rod 116 and the second cylinder rod 118 may actuate to steer the machine 100. In some instances, arms, shafts, gears, etc. may operably couple the steering wheel to the steering assembly 102 for steering the machine 100.

In some instances, the first cylinder rod 116 and the second cylinder rod 118 may actuate using pneumatics or hydraulics. The machine 100 may include reservoirs for accommodating the different extended lengths of the first cylinder rod 116 and the second cylinder rod 118 and either supplying or receiving fluid. In some instances, the steering assembly 102 may represent an electro-hydraulic steering system or be a component of an electro-hydraulic steering system. For example, in electro-hydraulic power steering, an electric motor may drive a pump for supplying pressure necessary for power steering. As such, the steering assembly 102 may be electronically controlled. Here, noted above, the machine 100 may include a controller (e.g., steering controller) that generates and transmits a control signal to the first cylinder rod 116 and the second cylinder rod 118 for steering the machine 100. The control signal may be generated in response to an operator moving a steering wheel or a remote operator electronically providing a desired amount of steering. In such instances, the control signal may be associated with the desired level of steering. For example, in response to the operator moving the steering wheel a control signal may be provided to the first cylinder rod 116 (or a controller coupled thereto). This control signal may be associated with an instructed steering angle of the machine 100 (e.g., ten degrees, thirty degrees, etc.). The first cylinder rod 116 may extend or retract in response to the control signal and based on the desired level of steering. Respective control signals may be sent to the first cylinder rod 116 and the second cylinder rod 118 depending on the level of steering.

Ends of the first cylinder rod 116 and the second cylinder rod 118 not coupled to the first steering arm 120 and the second steering arm 122 may couple to the frame 104 (or subframe) of the machine 100. As shown, the center link 110 may additionally couple to the frame 104. In some instances, the center link 110, the first cylinder rod 116, and/or the second cylinder rod 118 may pivotably couple to the frame 104. As a result of the illustrated arrangement, as the first cylinder rod 116 and the second cylinder rod 118 actuate (e.g., extend or retract), the first steering arm 120 and the second steering arm 122 are moved, causing the wheels 106 to turn. Also as a result of the actuation, the first tie rod 112 and the second tie rod 114, via their attachments to the first steering arm 120 and the second steering arm 122, respectively, cause the center link 110 to pivot relative to the frame 104.

The first cylinder rod 116 and the second cylinder rod 118 are shown including a cylinder portion and a rod portion. The rod portion may be received by the cylinder portion such that the rod portion may extend from the cylinder portion by varying lengths. In other words, the rod portion may extend from or retract into the cylinder portion. Depending on the steering of the machine 100, the rod portion may either extend from the cylinder portion or retract into the cylinder portion. Moreover, given the configuration of the steering assembly 102 as shown in FIG. 1, when the machine 100 is turned left or right, one of the rod portion of the first cylinder rod 116 or the second cylinder rod 118 will extend from the cylinder portion, while the other of the rod portion of the first cylinder rod 116 or the second cylinder rod 118 will retract into the cylinder portion. The cylinder portions of the first cylinder rod 116 and the second cylinder rod 118 are shown being coupled to the frame 104, whereas the rod portions of the first cylinder rod 116 and the second cylinder rod 118 are coupled to the first steering arm 120 and the second steering arm 122, respectively. However, in some instances, the cylinder portions of the first cylinder rod 116 and the second cylinder rod 118 may couple to the first steering arm 120 and the second steering arm 122, respectively. In such instances, the rod portions of the first cylinder rod 116 and the second cylinder rod 118 may couple to the frame 104.

In some instances, the steering assembly 102 may represent an Ackerman steering geometry. In Ackermann steering geometries, the wheels 106 may turn in unison through a known kinematic relationship. This may be accomplished, in part, by the first steering arm 120 and the second steering arm 122 being operably connected via the center link 110, the first tie rod 112, and the second tie rod 114. In other words, the first steering arm 120 and the second steering arm 122 may steer synchronously and by a related amount described by a kinematic relationship defined by the linkage design. Although the steering assembly 102 is shown including certain components, the steering assembly may include additional components, such as, kingpins, CV joints, connecting rods, and so forth.

The machine 100 is shown including a failure detection system 124. Generally, the failure detection system 124 may function to determine a failure of the steering assembly 102, or components thereof. For example, from time to time, the first tie rod 112, the second tie rod 114, the first cylinder rod 116, and/or the second cylinder rod 118 may fail (e.g., crack, bend, break, etc.). Additionally, the instructed steering angle (or amount of steering) may be different than a measured steering angle. This may lead to the machine 100 not steering as expected. Upon detecting a failure, operation of the machine 100 may be controlled. In the event of a linkage failure, the operator would notice a change in the steering behavior and bring the machine 100 to a safe stop. However, as discussed herein, in instances where the machine 100 is remotely controlled, the remote operator may not be able to detect changes in the steering behavior for understanding failures of the steering assembly 102. In these instances, the failure detection system 124 may function to determine a health, integrity, or failure of the steering assembly 102 for outputting notifications or bringing the machine 100 to a safe stop to avoid further damage.

The failure detection system 124 may include a failure detection controller 126 that determines whether a fault has been detected within the steering assembly 102. Sensor(s) 128 may generate, capture, or collect sensor data 130 associated with the steering assembly 102. In some instances, the sensor data 130 may indicate measured steering angles associated with the first steering arm 120 and the second steering arm 122. In some instances, a first sensor may be disposed on the first steering arm 120 and a second sensor may be disposed on the second steering arm 122. In such instances, the first sensor may measure (or data generated by the first sensor may be used to determine) a first steering angle 132 associated with the first steering arm 120 (or a first wheel) and the second sensor may measure (or data generated by the second sensor may be used to determine) a second steering angle 134 associated with the second steering arm 122 (or a second wheel).

As discussed herein, the first steering angle 132 may represent an angle between an axis disposed through a point of rotation (e.g., pin) at which the first cylinder rod 116 couples to the first steering arm 120 and a first wheel kingpin associated with the first steering arm 120, and a first longitudinal axis disposed along and through the center of the first cylinder rod 116. Likewise, the second steering angle 134 may represent an angle between an axis disposed through a point of rotation (e.g., pin) at which the second cylinder rod 118 couples to the second steering arm 122 and a second wheel kingpin associated with the second steering arm 122, and a second longitudinal axis disposed along and through the center of the second cylinder rod 118. More generally, the steering angles (i.e., the first steering angle 132 and the second steering angle 134) may be measured between an axis of the first steering arm 120 and the first cylinder rod 116, and the second steering arm 122 and the second cylinder rod 118. Of course, because the steering assembly 102 has a known geometry, which may be represented by kinematic relationships as described herein, angles other than the specific angles just described may be determined and used to ascertain a health of the steering assembly 102, according to the techniques described herein. Without limitation, such angles can include angles associated with the steering arms, the actuators, the tie rods, the frame, and/or other components and/or axes.

As the machine 100 maneuvers, the steering angles may adjust. Additionally, given that the steering assembly 102 may be Ackermann steering, the steering angles may include a defined kinematic relationship. That is, the steering angles may be constrained by the steering assembly 102 and include a defined kinematic relationship. As the sensors 128 are disposed on opposite sides of the machine 100, or determine steering angles on opposite sides of the machine 100, if the steering angles do not correspond or are not associated with the kinematic relationship, this may indicate a failure of the steering assembly 102. Accordingly, the failure detection controller 126 may receive the sensor data 130 for determining failures. In some instances, the failure detection controller 126 may receive the sensor data 130 according to a predetermined schedule and/or in response to certain operating conditions of the machine 100 (e.g., during turns, braking, certain accelerations, etc.).

To determine the kinematic relationship, the failure detection controller 126 may have access to kinematic data 136. The kinematic data 136 may include associations or orientations between the components of the steering assembly 102. For example, in some instances, the steering angles may be determined through known dimensions, lengths, orientations, etc. of the first cylinder rod 116 and/or the second cylinder rod 118. That is, given the coupling of the first cylinder rod 116 and the second cylinder rod 118 to the frame 104, the first steering arm 120, and the second steering arm 122, respectively, the failure detection controller 126 may use the kinematic data 136 to determine the kinematic relationship between the steering angles sensed by the first sensor and the steering angles sensed by the second sensor. Using the kinematic data 136, the first steering angle 132 and the second steering angle 134 may be associated with one another given the limited range of motions of the steering assembly 102. Additionally, the kinematic data 136 may include associations or orientations between the first steering arm 120 and the second steering arm 122, or between components of the steering assembly 102. For example, in some instances, the steering angles of the first steering arm 120 and the second steering arm 122 may be determined through known dimensions, lengths, orientations, etc. of the first tie rod 112, the second tie rod 114, the first cylinder rod 116, and/or the second cylinder rod 118. In other instances, the first steering angle 132 of the first steering arm 120 may be correlated or associated with the second steering angle 134 of the second steering arm 122 using dimensions, lengths, etc. of the first tie rod 112 and the second tie rod 114. As such, the kinematic data 136 may include known movement characteristics of the first tie rod 112, the second tie rod 114, the first cylinder rod 116, the second cylinder rod 118, maximum extensions or ranges of the first tie rod 112, the second tie rod 114, the first cylinder rod 116, the second cylinder rod 118, and so forth. The kinematic data 136 may also indicate the connections or couplings between the first tie rod 112 with the center link 110 and the first steering arm 120, the second tie rod 114 with the center link 110 and the second steering arm 122, the first cylinder rod 116 with the frame 104 and the first steering arm 120, and/or the second cylinder rod 118 with the frame 104 and the second steering arm 122, for example.

By way of brief example, the failure detection controller 126 may receive first sensor data from the first sensor coupled to the first cylinder rod 116 and second sensor data from the second sensor coupled to the second cylinder rod 118 (or the second steering arm 122). The failure detection controller 126 may determine a first steering angle from the first sensor data and a second steering angle from the second sensor data. Using the first steering angle and the kinematic data 136, the failure detection controller 126 may determine a predicted or expected steering angle associated with the second cylinder rod 118. This expected steering angle may be compared against the actual second steering angle 134, as measured (i.e., via the second sensor data). If the expected steering angle and the second steering angle 134 (as measured) are within a certain threshold this may indicate that the steering assembly 102 is functioning properly. However, if the expected steering angle and the second steering angle 134 are not within a certain threshold, this may indicate that the steering assembly 102 is not functioning properly. Additionally, or alternatively, in some instances, using the second steering angle 134 and the kinematic data 136, the failure detection controller 126 may determine a predicted or expected steering angle associated with the first cylinder rod 116 (or the first steering arm 120). This expected steering angle may be compared against the actual first steering angle 132, as measured (i.e., via the first sensor data). If the expected steering angle and the first steering angle 132 are within a certain threshold, this may indicate that the steering assembly 102 is functioning properly. However, if the expected steering angle and the first steering angle 132 are not within a certain threshold, this may indicate that the steering assembly 102 is not functioning properly.

In some instances, the failure detection controller 126 may also compare the measured steering angles against instructed levels of steering. For example, during a steering operation, an operator may provide commands that are associated with a desired amount of steering. These commands may be provided as signals that control actuation of the first cylinder rod 116 and the second cylinder rod 118. Moreover, the signals may be correlated with certain steering angles of the machine 100. In some instances, the steering angles may be determined, or associated with the machine direction, speed, weight balance, load, and/or braking. The failure detection controller 126 may compare the instructed steering angles (or the amount of steering) against the measured steering angles. For example, if the first cylinder rod 116 actuates to a certain length associated with an instructed steering angle, this angle may be compared against the measured first steering angle. If a threshold difference exists therebetween, this may be indicative of a failed steering assembly 102.

In some instances, the sensor(s) 128 may include capacitive-type sensors, hall effect sensors, eddy current sensors, piezo-electric sensors, photodiodes, or any combination thereof. The sensor(s) 128 may be environmentally robust to resist liquid ingress, and withstand environments of the machine 100, such as a mud, dirt, rocks, dust, ice, snow, and so forth. The sensor(s) 128 may include seals, gaskets, or bushings to seal the sensor(s) 128 from environmental conditions. As discussed herein, the sensor(s) 128 may isolate roll and pitch movements of the machine 100 to measure the steering angles. Additionally, in some instances, the sensor(s) 128 may include a steering resolution of 0.035 degrees rotation per bit or better. Additionally, the sensor(s) 128, or the sensor data 130 reported by the sensor(s) 128, may be monotonic. This way, the measured steering angles may either be increasing or decreasing.

As described herein, the sensor(s) 134 sense relative rotation of steering components. The sensor data can be used in a number of applications. For example, and as detailed herein, sensor outputs may be considered to identify steering system failures, to provide feedback, e.g., in a steering feedback loop, and/or to implement a haptic feedback system (e.g., by providing a vibration or resistance as a control aid, warning, coaching, or the like). For example, precise angular measurements may be required to implement some or all of these functions, and in some instances, a resolution of 0.035 degrees rotation per bit or better may be required. For instance, and without limitation, a haptic feedback system may require sensor data having a 0.035 degrees rotation per bit fidelity to provide the operator with a continuous range of haptic feedback and eliminate experienced jerks in feedback.

The sensor(s) 128 may be located external to the first cylinder rod 116 and the second cylinder rod 118, respectively, to reduce repair time and cost. As discussed herein, the sensor(s) 128 may be mounted vertically above a point of rotation at which the first cylinder rod 116 and the second cylinder rod 118 couple to the first steering arm 120 and the second steering arm 122, respectively. In some instances, the sensor(s) 128 may be mounted above a pin that couples the first cylinder rod 116 and the second cylinder rod 118 to the first steering arm 120 and the second steering arm 122, respectively.

The mounting of the sensor(s) 128 may include a mechanism configured to isolate undesired influence on the steering angle, such as an isolation mechanism described further below. For example, roll of the first cylinder rod 116 and the second cylinder rod 118 (about the ball joint coupling the first cylinder rod 116 and the second cylinder rod 118 to the first steering arm 120 and the second steering arm 122, respectively) may impart undesired influence on the steering angles. Additionally, a pitch of the first cylinder rod 116 and the second cylinder rod 118 (due to compression and expansion of a suspension system) may impart undesired influence on the steering angles. The mechanism may isolate these movements such that the steering angles are accurately determined for use in detecting faults, steering control, and haptic feedback. In some instances, this may be accomplished, in part, by disposing the sensor(s) 128 above ends of the first cylinder rod 116 and the second cylinder rod 118 at the first steering arm 120 and the second steering arm 122, respectively, and coupling the sensor(s) 128 to ends of the first cylinder rod 116 and the second cylinder rod 118.

In some instances, the sensor(s) 128 may measure the stroke length of the first cylinder rod 116 and the second cylinder rod 118, respectively, to determine the steering angles through a kinematic transformation. That is, the kinematic data 136, or a kinematic relationship between the stroke length of the first cylinder rod 116 and the second cylinder rod 118, may be used to measure the steering angle of the first steering arm 120 and the second steering arm 122. Further, the first tie rod 112 and the second tie rod 114 may physically constrain the length of the first cylinder rod 116 and the second cylinder rod 118. Therefore, the stroke length of the first cylinder rod 116 and the second cylinder rod 118 may be correlated to steering angles.

The failure detection system 124 may include an alert controller 138 that functions to output notifications, indications, or other alerts 140. For example, the failure detection controller 126 may communicate with the alert controller 138, and in response, the alert controller 138 may output one or more alerts 140. The alerts 140 may indicate the detection of a fault within the steering assembly 102, and/or specific components of the steering assembly 102 (e.g., first tie rod 112). By way of example, if the first cylinder rod 116 breaks, the expected steering angle and measured steering angle of the first cylinder rod 116 may be different (or a threshold difference). This may trigger the alert 140 indicating the failure, and in response, the operator may bring the machine 100 to a stop. In instances where the machine 100 is remotely controlled, the alert 140 may trigger one or more automatic actions (e.g., stop) or serve to notify a remote operator for taking one or more actions. In some instances, the alerts 140 may be audible (e.g., series of beeps), visual (e.g., lights, display, etc.), haptic (e.g., vibrational), etc. The alerts 140 may also be information output on a user interface (UI) within the operator station. For example, the alerts 140 may be an indication output on the UI that indicates a failure of one or more components of the steering assembly 102, to schedule maintenance for the steering assembly 102, and so forth.

The failure detection system 124 may additionally include a movement controller 142. In some examples, based on detecting a fault at the steering assembly 102, movement of the machine 100 may be restricted or otherwise controlled. The movement controller 142 may be configured to restrain, brake, or prevent movement of the machine 100. For example, in the event that the failure detection controller 126 determines a fault, the movement controller 142 may apply braking at the machine 100 and/or power down components of the machine 100 (e.g., engine). In some instances, the failure detection controller 126 may instruct the movement controller 142 to restrain or restrict movement of the machine 100 to prevent further damage to the steering assembly 102 (or components of the machine 100). Additionally, or alternatively, the movement controller 142 may be triggered to restrain or restrict movement of the machine 100 based on the alerts 140 being output by the alert controller 138.

In some instances, the machine 100 may communicatively couple to a remote computing device or a remote system 144. The machine 100 may be in communication with the remote system 144 via a network 146. The network 146 may be a local area network ("LAN"), a larger network such as a wide area network ("WAN"), or a collection of networks, such as the Internet. Protocols for network communication (e.g., wireless machine-to-machine communication protocols), such as TCP/IP, may be used to implement the network 146.

Network interfaces 148 may enable the machine 100 to communicate via the network 146 with the remote system 144. The network interfaces 148 may include a combination of hardware, software, and/or firmware and may include software drivers for enabling any variety of protocol-based communications, and any variety of wireline and/or wireless ports/antennas. For example, the network interfaces 148 may comprise one or more of WiFi, cellular radio, a wireless (e.g., IEEE 802.1x-based) interface, a Bluetooth® interface, and the like.

In some instances, the remote system 144 may be implemented as one or more servers and may, in some instances form a portion of a network-accessible computing platform implemented as a computing infrastructure of processors, storage, software, data access, and so forth that is maintained and accessible via the network 146 such as the Internet. Cloud-based systems may not require end-user knowledge of the physical location and configuration of the system that delivers the services. For example, the remote system 144 may be located in an environment of the machine 100 (e.g., worksite) and/or may be located remotely from the environment. Common expressions associated for the remote system 144 include "on-demand computing", "software as a service (SaaS)", "platform computing", "network-accessible platform", "cloud services", "data centers", and so forth.

In any of the examples described herein, the functionality of the failure detection system 124 may be distributed so that certain operations are performed by the machine 100 and other operations are performed by the remote system 144. For example, given that the remote system 144 may have a computational capacity that far exceeds the machine 100, the remote system 144 may determine patterns from the sensor data 130 for accurately determining failures at the steering assembly 102. In such instances, the sensor(s) 128 may generate the sensor data 130 indicating the steering angles and the sensor data 130 may be transmitted to the remote system 144. In response, the remote system 144 may analyze the sensor data 130, comparing the steering angles, for use in determining faults of the steering assembly 102. In instances where the remote system 144 determines a fault, the remote system 144 may transmit the alert 140 back to the machine 100 for output. Additionally, or alternatively, the remote system 144 may communicate with the remote operator for outputting the alert 140. Further, the remote system 144 may instruct the machine 100 to restrain or halt movement via the movement controller 142. Accordingly, the remote system 144 may control operations of the machine 100 and/or determine faults of the steering assembly 102.

Although illustrated as including certain components, the machine 100 may further include any number of other components within the operator station such as, one or more of a location sensor (e.g., global positioning system (GPS)), an air conditioning system, a heating system, collision avoidance systems, cameras, etc. These components and/or systems are powered by any suitable mechanism, such as by using a direct current (DC) power supply powered by the engine along with a generator (not shown) and/or inverter (not shown), an alternating current (AC) power supply powered by the engine and a generator, and/or by mechanical coupling to the engine. The machine 100 may include controllers that communicatively couple to the components and/or systems for controlling their operation.

The machine 100, controllers or modules of the machine 100 (e.g., the failure detection controller 126) may include processor(s) and/or memory. The processor(s) may carry out operations stored in the memory. Where present, the processor(s) may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The memory may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

The machine 100 and/or the remote system 144 may include components for determining failures of the steering assembly 102. The machine 100 and the remote system 144 may communicatively couple to one another for permitting remote control of the machine, and transmission of data. In the event that failures are detected, alerts 140 may be output and/or movement of the machine 100 may be limited. The sensor 128 used for determining faults may be located external to the cylinder rods for reducing repair cost, time, and effort. In turn, the machine 100 may have increased availability.

Figure 2:
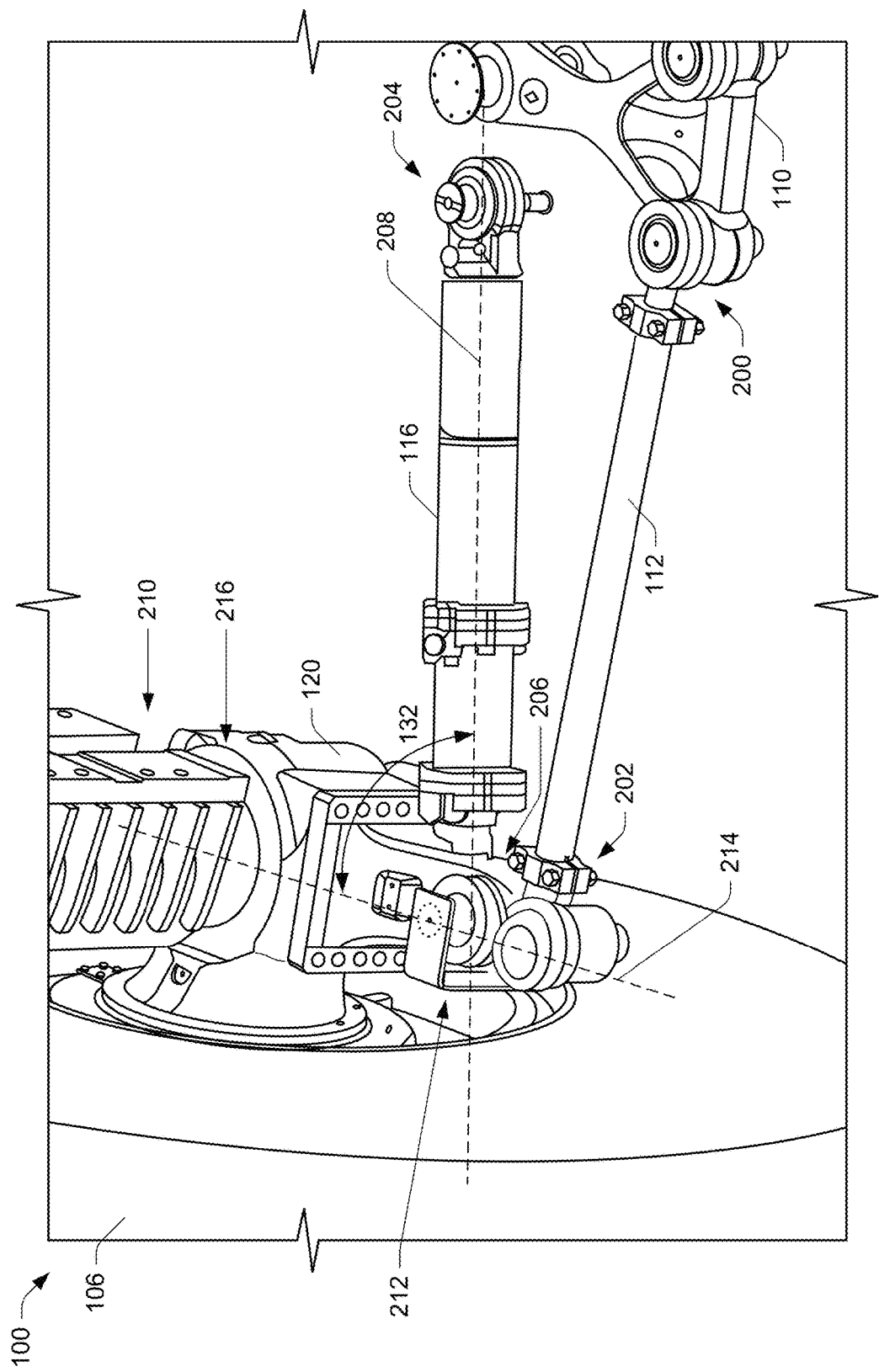
FIG. 2 illustrates a partial perspective detailed view of the steering assembly of FIG. 1, according to an embodiment of the present disclosure.

FIG. 2 illustrates a partial detailed view of the steering assembly 102. Specifically, FIG. 2 illustrates one side of the steering assembly 102, such as the first tie rod 112, the first cylinder rod 116, and the first steering arm 120. However, although the discussion herein relates to one side of the steering assembly 102, it is to be understood that the second tie rod 114, the second cylinder rod 118, and the second steering arm 122 may function similarly. Additionally, FIG. 2 omits the frame 104 to which the center link 110 and the first cylinder rod 116 couple.

The first tie rod 112 is shown including a first end 200 coupled to the center link 110 and a second end 202 coupled to the first steering arm 120. In some instances, the first end 200 may couple to the center link 110 via a pin disposed through respective channels or passages in the center link 110 and the first tie rod 112 (e.g., rod eyes). Additionally, bearings (e.g., spherical-shaped bearings, knuckles, joints, etc.) may assist in pivotable movement of the first tie rod 112. Similarly, the second end 202 may couple to the first steering arm 120 via a pin disposed through respective channels or passages in the first steering arm 120 and the first tie rod 112 (e.g., rod eyes). Bearings may assist in pivotable movement of the first tie rod 112. In some instances, the first tie rod 112 may adjust in length.

The first cylinder rod 116 includes a first end 204 configured to couple to the frame 104 (not shown in FIG. 2) and a second end 206 coupled to the first steering arm 120. In some instances, the first end 204 may couple to the frame 104 via a pin disposed through respective channels or passages in the frame 104 and the first cylinder rod 116. Additionally, bearings (e.g., spherical-shaped bearings) may assist in pivotable movement of the first cylinder rod 116 about, or in relation to, the frame 104. Similarly, the second end 206 may couple to the first steering arm 120 via a pin disposed through respective channels or passages in the first steering arm 120 and the first cylinder rod 116. Bearings may assist in pivotable movement of the first cylinder rod 116. Further, as discussed above in relation to FIG. 1, the first cylinder rod 116 may include a cylinder portion and a rod portion. The rod portion may extend at various lengths from the cylinder portion for steering the machine 100 using pneumatics or hydraulics. In some instances, the cylinder portion may couple to the frame 104 or the first steering arm 120, and the rod portion may couple to the frame 104 or the first steering arm 120.

The first cylinder rod 116 is shown including a longitudinal axis 208 that centrally extends through the first cylinder rod 116, along a length of the first cylinder rod 116, between the first end 204 and the second end 206. In some instances, as the machine 100 maneuvers or as the first cylinder rod 116 actuates to steer the machine 100, the first cylinder rod 116 may experience rotation (e.g., roll, twisting, etc.) about the longitudinal axis 208. In some instances, the cylinder portion and/or the rod portion of the first cylinder rod 116 may experience rotational movement. The bearings coupling the first cylinder rod 116 to the frame 104 and the first steering arm 120 may assist, or permit, this rotational movement. In part, the rotational movement may be experienced as a result of the machine 100 traveling over uneven terrain or as the first cylinder rod 116 actuates to extend or retract.

The first steering arm 120 may couple to suspension components 210 of the machine 100, such as a spring, strut, or dampener. The suspension components 210 may provide comfort to an operator of the machine 100 and/or assist in maintaining control of the machine 100 during operation. The suspension components 210 may allow for vertical displacement to the machine 100 (Y-direction). As shown, the suspension components 210 may couple to the first steering arm 120 at a location offset from where the first tie rod 112 and the first cylinder rod 116 couple to the first steering arm 120. The suspension components 210 may impart pitch movement (e.g., Y-direction) into the first cylinder rod 116. For example, as the suspension components extend and compress, the first cylinder rod 116 may move up and down with the movement of the machine 100. In such instances, the first cylinder rod 116 may extend or retract.

In some instances, the first steering arm 120 may include a kingpin 216 that represents a main pivot point on the first steering arm 120. The kingpin 216 may serve as an axis about which the wheels, or a wheel coupled to the first steering arm 120, rotates.

A bracket 212 is shown coupled to the first steering arm 120. The bracket 212 disposes a sensor relative to the second end 206 of the first cylinder rod 116, and the sensor is configured to measure an angular displacement of the first cylinder rod relative to the first steering arm 120. For example, the bracket 212 is shown including multiple sides or surfaces, which may generally form a U-shape. As discussed in more detail below with reference to FIG. 3, the bracket 212 may include a first surface that couples to a bottom of the first steering arm 120, a second surface that extends from the first surface (e.g., in the Y-direction), and a third surface that extends from the second surface. The third surface may dispose a sensor among the sensors 128 vertically above the second end 206 of the first cylinder rod 116. For example, the sensor may be disposed vertically above a pin disposed through the second end 206 of the first cylinder rod 116 and the first steering arm 120. As discussed herein, portions of the sensor may also couple to the first cylinder rod 116 for measuring an angular displacement of the first cylinder rod 116 relative to the first steering arm 120 (e.g., to determine the first steering angle 132). Moreover, as shown, the sensor may be located external to, or non-integral with, the first cylinder rod 116. This may permit replacement of the sensor in less time and/or with reduced costs.

In some instances, the sensor may be aligned with the longitudinal axis 208 of the first cylinder rod 116. This may permit accurate measurement of the first steering angle 132. Moreover, the sensor may be aligned with an axis 214 of the first steering arm 120. In some instances, the axis 214 may extend along a central position of the first steering arm 120, and may be disposed through a point at which the first cylinder rod 116 couples to the first steering arm 120. In other words, the axis 214 may be disposed through a first point of rotation about which the first cylinder rod 116 couples to the first steering arm 120 (e.g., pin) and a second point associated with the kingpin 216 of the first steering arm 120 (through a rotational axis defined by the kingpin 216). That is, the axis 214 max extend through the center of the kingpin 216 to the center of a pin coupling the first cylinder rod 116 to the first steering arm 120.

The sensor may measure the first steering angle 132 disposed between the longitudinal axis 208 and the axis 214. In FIG. 2, the first steering angle 132 is shown extending between the longitudinal axis 208 and the axis 214. As the machine 100 operates, and the first cylinder rod 116 extends or retracts, the first steering angle 132 may increase or decrease and the sensor may measure the first steering angle 132. Extending the first cylinder rod 116 results in an angle with a monotonic relationship. As discussed herein, the bracket 212 and sensor arrangement may isolate movements of the suspension components (e.g., vertical in the Y-direction) and/or rotations of the first cylinder rod 116 (e.g., about the X-axis), to measure only angular displacements, e.g., rotations about the y-axis for determining the first steering angle 132. In doing so, the sensor may accurately measure the first steering angle 132 for use by the failure detection controller 126 determining faults of the steering assembly 102.

Although a specific shape or design of the bracket 212 is shown, other brackets may be included for locating the sensor on the longitudinal axis 208 of the first cylinder rod 116. For example, other brackets may locate the sensor on the longitudinal axis 208 where one part of the sensor remains stationary with the first steering arm 120 and another other part of the sensor tracks the rotation of the first cylinder rod 116 (as discussed herein).

Figure 3:
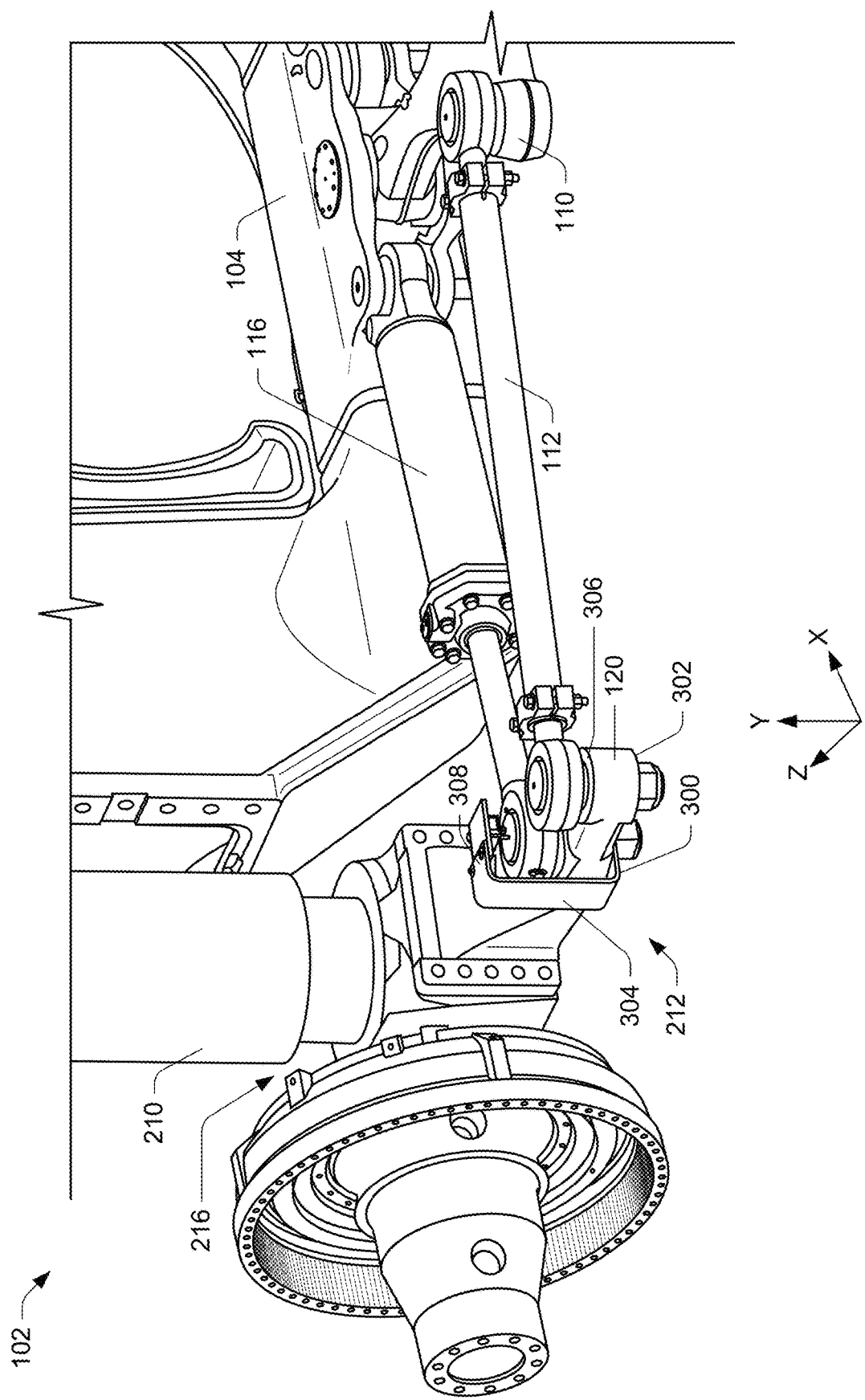
FIG. 3 illustrates a partial perspective detailed view of the steering assembly of FIG. 1, according to an embodiment of the present disclosure.

FIG. 3 illustrates a detailed view of the steering assembly 102, with the wheel 106 omitted to illustrate components of the steering assembly 102. As discussed above, the first tie rod 112 and the first cylinder rod 116 may couple to the first steering arm 120 (e.g., via pins disposed through spherical bearings).

The bracket 212 may include multiple sides or surfaces for disposing the sensor vertically above (e.g., in the Y-direction) the second end 206 of the first cylinder rod 116. For example, a first surface 300 of the bracket 212 (e.g., bottom) may couple to a bottom surface 302 of the first steering arm 120. A second surface 304 (e.g., side) may extend from the first surface 300 and around an exterior (or side) of the first steering arm 120. For example, as shown, the second surface 304 may extend from the first surface 300 and in a direction towards a top surface 306 of the first steering arm 120 (e.g., Y-direction). Additionally, as shown, the first tie rod 112 and the first cylinder rod 116 may couple to the first steering arm 120 along, or at, the top surface 306. Additionally, the bracket 212 includes a third surface 308 that extends from the second surface 304, over the first steering arm 120 (X-direction). Having the third surface 308 disposed over the first steering arm 120, or above the top surface 306, permits the sensor to be disposed vertically above the first cylinder rod 116.

In some instances, the sensor may couple to the third surface 308 such that the sensor is concentric with a pin, or point of rotation, of the second end 206 of the first cylinder rod 116 relative to the first steering arm 120. In some instances, a plate or flange may couple to the third surface 308 (e.g., via fasteners, welding, or the like). Here, the sensor may couple to the flange such that the sensor is over the second end 206 of the first cylinder rod 116, between the flange and the second end 206 of the first cylinder rod 116. Moreover, as discussed herein, being as the first cylinder rod 116 may move up and down (e.g., in the Y-direction) or rotate (e.g., about its longitudinal axis), the position of the sensor allows for determining the rotational displacement of the first cylinder rod 116 (e.g., about the Y-axis) without being influenced by these effects. In doing so, the sensor may accurately measure the first steering angle 132 for use by the failure detection controller 126 (and/or a steering controller) detecting failures.

Figure 4:
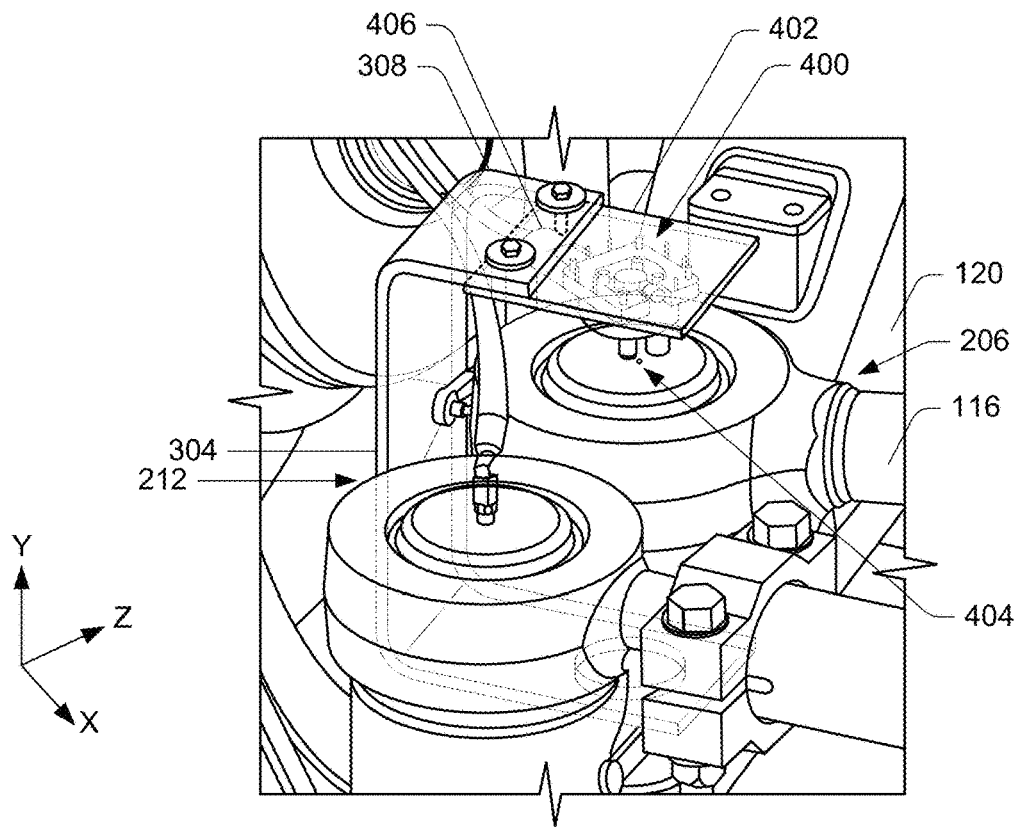
FIG. 4 illustrates a perspective detailed view of an example isolating component of the machine of FIG. 1, according to an embodiment of the present disclosure.

FIG. 4 illustrates a detailed view showing a sensor 400 disposed above the second end 206 of the first cylinder rod 116. Some of the components of FIG. 4 are shown in dashed lines to illustrate their position in front of or behind other components. FIG. 4 illustrates partial views of components of the steering assembly 102, such as the first tie rod 112, the first cylinder rod 116, and/or the first steering arm 120. Additionally, in FIG. 4, portions of the bracket 212 are shown as transparent to illustrate the sensor 400, or additional components of the steering assembly 102.

As discussed above, the bracket 212 may couple to the first steering arm 120 to dispose the third surface 308 above the second end 206 of the first cylinder rod 116. For example, in FIG. 4, the second surface 304 is shown extending along a side of the first steering arm 120, and the third surface 308 extends over the second end 206 of the first cylinder rod 116. Additionally, FIG. 4 illustrates a flange 402 coupled (e.g., via fasteners) to the bracket 212 (e.g., at the third surface 308). As shown, the sensor 400 may couple to the flange 402. However, in some instances, the third surface 308 may be of sufficient size for receiving the sensor 400, in such instances the flange 402 may be omitted.

The sensor 400 may be disposed vertically above (e.g., in the Y-direction) the second end 206 of the first cylinder rod 116. In some instances, a center of the sensor 400 may be aligned, or the sensor 400 may be vertically aligned with a center of rotation 404 of the second end 206 of the first cylinder rod 116. For example, the first cylinder rod 116 may rotate about the center of rotation 404 during a steering of the machine 100. In some instances, the center of rotation 404 may be associated with a point of a pin that couples the first cylinder rod 116 to the first steering arm 120. In doing so, the sensor 400 may measure the first steering angle 132. At this location, the sensor 400 may detect angles for use in determining a breakage or failure of components within the steering assembly 102.

The sensor 400 may include or operably couple to an arm 406. The arm 406 may couple to a toggle link (shown in more detail in FIG. 5, and discussed below). The toggle link may couple to the first cylinder rod 116, at the second end 206. In doing so, as the first cylinder rod 116 rotates, the toggle link may correspondingly move. This movement may be imparted to the arm 406 and in turn, the sensor 400 may measure the displacement of the arm 406 for measuring the first steering angle 132 (e.g., about the Y-axis). As such, the arm 406 may move with a movement, or rotation, of the first cylinder rod 116 by coupling to the first cylinder rod 116 at the second end 206. Moreover, the sensor 400 may be isolated from rotational movements of the first cylinder rod 116 (about the X-axis) or vertical movements (in the Y-direction) of the first steering arm 120. These movements, if measured, may influence the first steering angle 132 and lead to improper measures of the first steering angle 132. However, by isolating the sensor 400, the first steering angle 132 may be accurately measured. That is, being as the bracket 212 couples to the first steering arm 120, the sensor 400 may vertically translate with displacements of the suspension components 210. Additionally, the sensor 400 is located external to the first cylinder rod 116 to avoid detecting rotational movements (about the X-axis) that may influence the first steering angle 132. In some instances, the sensor 400, the bracket 212, and/or the flange 402 may include an adjustment mechanism to substantially align the sensor 400 above the center of rotation 404, or above the pin.

The sensor 400 may include a low-profile for being disposed between the bracket 212 (or the flange 402) and the first cylinder rod 116. In some instances, the sensor 400 may include a sufficient amount of angular rotation. By way of example, the sensor 400 may measure 110 degrees of angular rotation. The sensor 400 may include a steering resolution of 0.035 degrees of rotation per bit or better. This level of resolution may control haptic feedback without the operator experiencing undesired torque rippling or vibration input from the steering wheel or the joystick.

Figure 5:
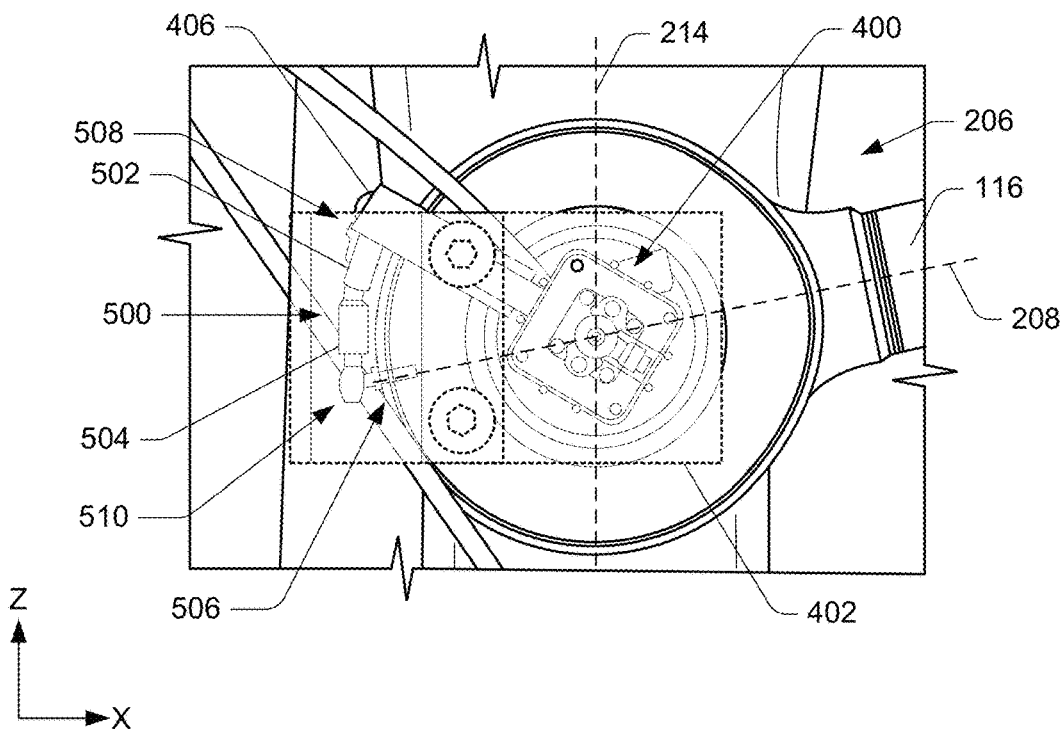
FIG. 5 illustrates a planar detailed view of the isolating component of FIG. 4, according to an embodiment of the present disclosure.

FIG. 5 is a top view of components illustrated in FIG. 4, including the sensor 400 and first cylinder rod 116. In FIG. 5, the bracket 212 is shown in hidden lines, to better illustrate components, including the sensor 400, of the steering assembly 102.

As introduced above in FIG. 4, the sensor 400 may couple to the flange 402, or third surface 308 of the bracket 212. Additionally, the arm 406 couples to the sensor 400 and extends in a direction away from the center of rotation 404 or radially outward from the arm 406. The arm 406 couples to a toggle link 500. The toggle link 500 includes a proximal end 508 pivotably coupled to the arm 406 (e.g., via a joint and a fastener) and a distal end 510 pivotably coupled to the first cylinder rod 116 (e.g., via a joint and a fastener). More specifically, the toggle link 500 may include a first portion 502 coupled to the arm 406 and a second portion 504 coupled to the second end 206 of the first cylinder rod 116. The first portion 502 and the second portion 504 may operably couple to one another. More specifically, the first portion 502 and the second portion 504 may be configured to move relative to each other while maintaining attachment. Moreover, as shown, the second portion 504 may couple to the second end 206 of the first cylinder rod 116 via a fastener 506. In some instances, the second portion 504 may include spherical ends, or joints, (e.g., ball joint) through which the fastener 506 is disposed for allowing pivotable movement of the second portion 504 relative to the first cylinder rod 116. Additional details and features of the toggle link are described below with reference to FIG. 6.

Although referred to as a "toggle link," the "toggle link" may more generally represent a link. Additionally, although the toggle link 500 is shown as including two portions, the toggle link 500 or other links may include more or fewer portions to isolate rotation about the Y-axis from other pitch/roll movements.

Coupling the toggle link 500 to the arm 406 allows for rotational movement of the first cylinder rod 116 to be sensed by the sensor 400. That is, as the second end 206 of the first cylinder rod 116 rotates, the toggle link 500 may correspondingly move through the coupling of the toggle link 500 to the second end 206 of the first cylinder rod 116. The sensor 400 may associate the movement with the first steering angle 132, as measured between the longitudinal axis 208 and the axis 214. Moreover, in some instances, the fastener 506 may be aligned with the longitudinal axis 208 of the first cylinder rod 116. This allows the toggle link 500 to correspondingly move with the first cylinder rod 116 and permits the first steering angle 132 to be accurately measured by the sensor 400.

The toggle link 500 may isolate roll and pitch movements of the first cylinder rod 116. For example, without the toggle link 500, the sensor 400 may detect misleading or inaccurate steering angles. In other words, the position of the sensor 400 and the coupling of the toggle link 500 to the sensor 400, via the arm 406, may avoid imparting interferences from other degrees of freedom not related to the first steering angle 132 (e.g., vertical displacement of the suspension components 210 and/or roll and pitch of the first cylinder rod 116). As such, the sensor 400 may operably couple to the second end 206 of the first cylinder rod 116 to reduce influences imparted by rolling of the first cylinder rod 116.

Figure 6:
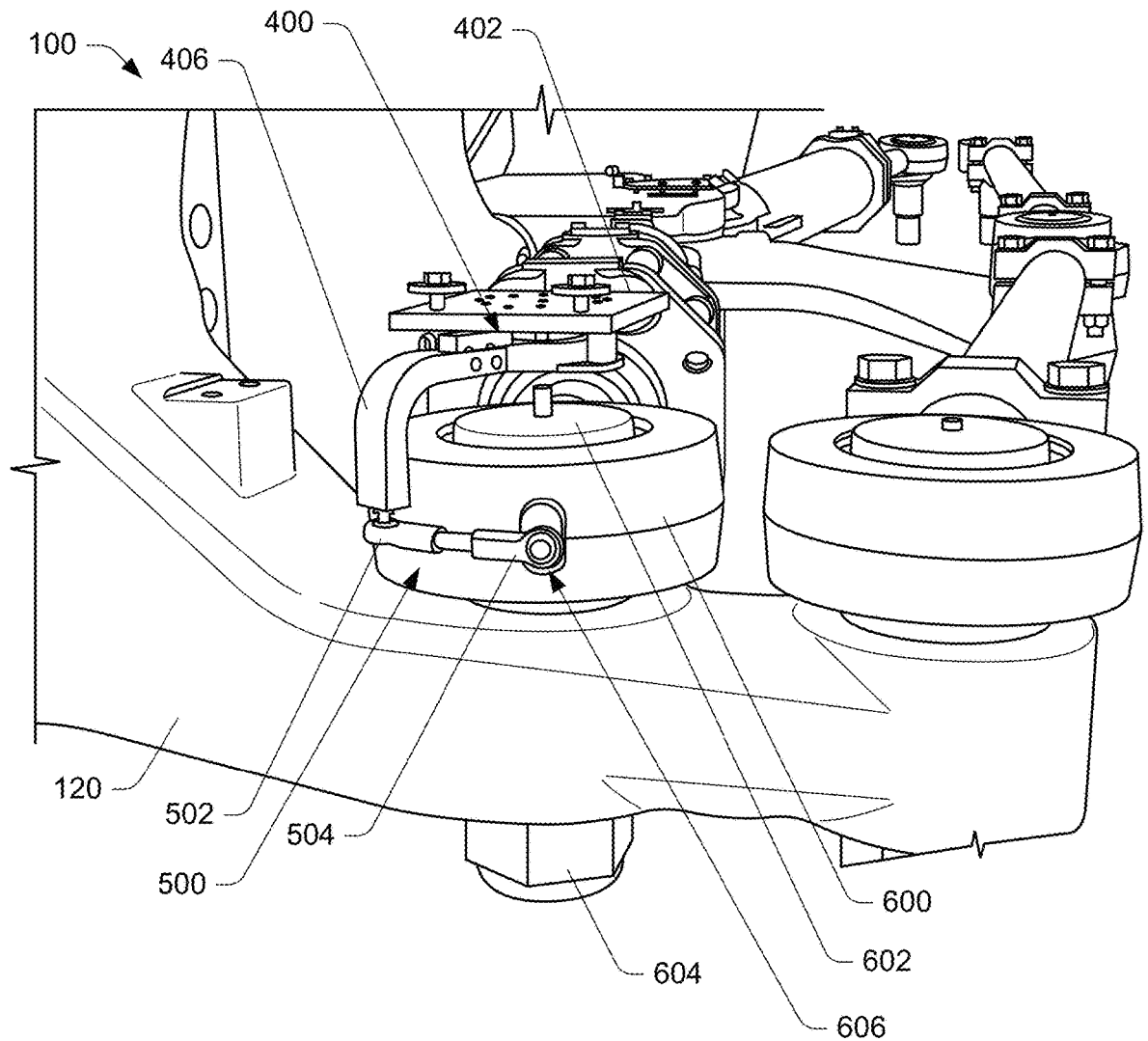
FIG. 6 illustrates a partial perspective view of the steering assembly of FIG. 1, according to an embodiment of the present disclosure.

FIG. 6 illustrates a partial view of the steering assembly 102. In FIG. 6, the bracket 212 is removed to illustrate the position and orientation of the toggle link 500, as well as the connection between the toggle link 500, the arm 406, and the first cylinder rod 116

As introduced above, the second end 206 of the first cylinder rod 116 may pivotably couple to the first steering arm 120. For example, the second end 206 may include a rod eye 600 through which a pin 602 is disposed. The rod eye 600 may also include a bearing for assisting in the rotational movement of the first cylinder rod 116 about the pin 602. For example, a spherical bearing may allow the roll and pitch movements of the first cylinder rod 116 in addition to the rotational motion of the first cylinder rod 116. A fastener 604 (e.g., nut) may secure the pin 602 to the first steering arm 120. In doing so, the second end 206 of the first cylinder rod 116 may pivotably couple to the first steering arm 120. The rod eye 600 (e.g., spherical) may provide rotational movement of the second end 206 about the pin 602.

The sensor 400 couples to the flange 402 so as to be interposed between the flange 402 and the pin 602. The sensor 400 may include, or couple to, the arm 406. As shown, the arm 406 may extend from a position disposed vertically above the pin 602 (or a top of the rod eye 600) to a position along a side of the pin 602 (or a side of the rod eye 600). The first portion 502 of the toggle link 500 couples to an end of the arm 406, opposite a position in which the arm 406 couples to the sensor 400. In some instances, the first portion 502 may include a spherical ends, or joints, (e.g., ball joint) through which a fastener is disposed for coupling the toggle link 500 to the arm 406. The joint may allow for rotational or pivotable movement of the first portion 502 relative to the arm 406.

The second portion 504 couples to the rod eye 600, at a position along the longitudinal axis 208 of the first cylinder rod 116. For example, the fastener 506 (not shown in FIG. 6) may be disposed through a spherical bearing 606 of the second portion 504. The fastener 506 may be aligned with the longitudinal axis 208 of the first cylinder rod 116. More generally, the toggle link 500 may be free to pivot about a position or point that coincides with the longitudinal axis 208 of the first cylinder rod 116. The rod eye 600 may include a receptacle (e.g., threads) for receiving the fastener 506.

The first portion 502 and the second portion 504 of the toggle link 500 may operably couple to one another to permit a movement of the rod eye 600 to be measured by the sensor 400. That is, as the first cylinder rod 116 extends and retracts, thereby steering the machine 100, the coupling of the toggle link 500 to the first cylinder rod 116 may impart movement to the arm 406. The movement of the arm 406, and the coupling of the arm 406 to the sensor 400, may be sensed for determining the first steering angle 132. In some instances, the sensor 400 may output a monotonic value that either represents whether the first steering angle 132 is increasing or decreasing with a stroke of the first cylinder rod 116, relative to a reference position.

In some instances, the sensor 400 may represent a sensor system, or assembly, that includes the sensor 400, the arm 406, and/or the toggle link 500 for measuring the first steering angle 132. Moreover, although the above discussion with regard to the first steering arm 120, or component disposed on or coupled to the first steering arm 120, similar and like components may be disposed on or coupled to the second steering arm 122. As such, the machine 100 may include sensors 128 that are not co-located, or which are located on separate components of the machine 100, such as a first side and a second side (i.e., opposite of each other).

Figure 7:
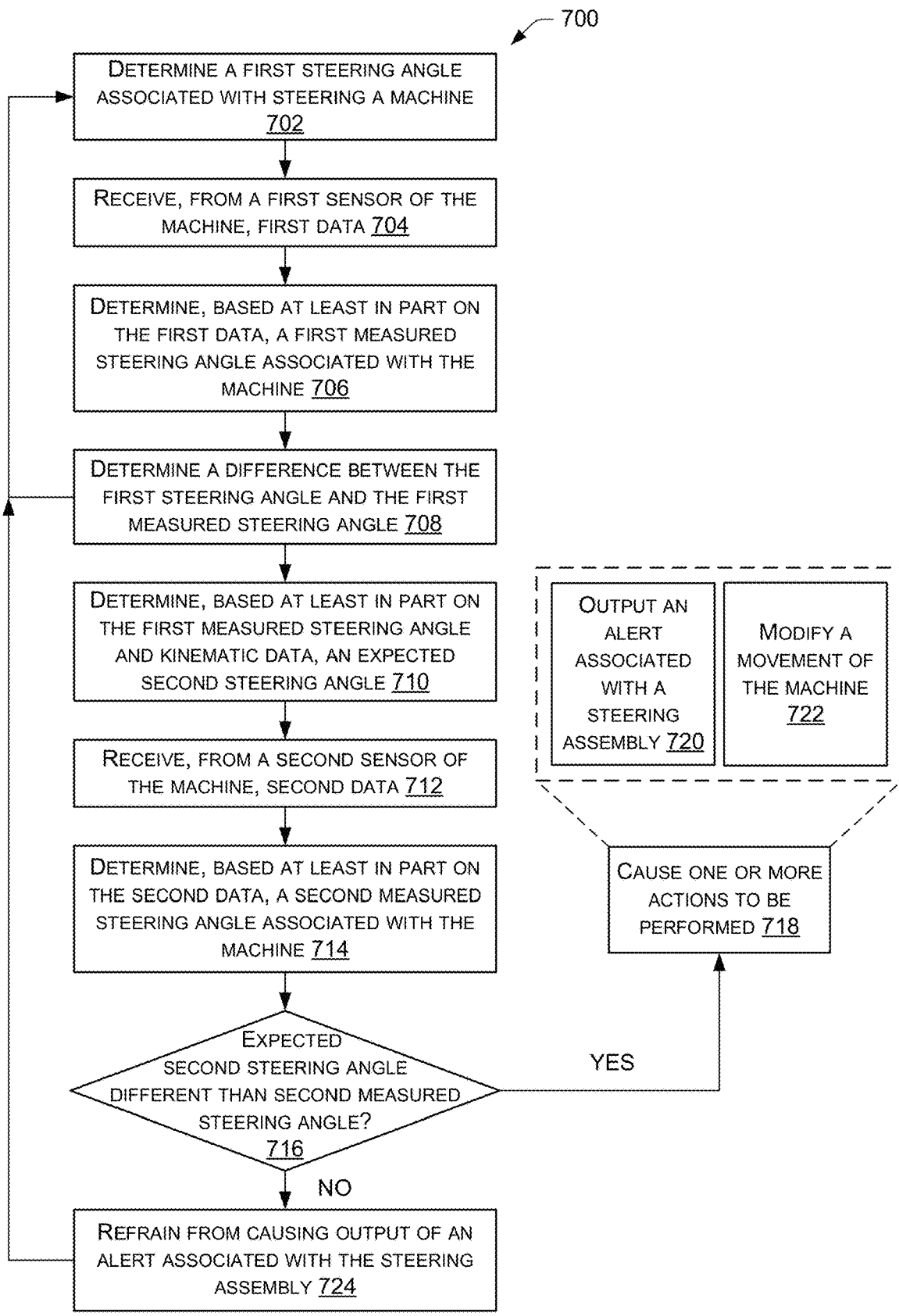
FIG. 7 illustrates an example process for determining a steering angle of a machine for use in determining a failure of a steering assembly of the machine, according to an embodiment of the present disclosure.

FIG. 7 illustrate a process 700 for determining steering angles of the machine 100 for use in determining steering angles of the machine 100 and/or a failure of one of more components of the steering assembly 102. The process 700 described herein is illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process 700, or alternative processes, and not all of the blocks need be executed. For discussion purposes, the process 700 is described with reference to the environments, machines, architectures, and systems described in the examples herein, such as, for example those described with respect to FIGS. 1-6, although the process 700 may be implemented in a wide variety of other environments, machines, architectures, and systems.

In some instances, the process 700 may be performed by the machine 100 and/or the remote system 144. For example, the failure detection system 124 may be implemented at the remote system 144 for determining a failure of one of more components of the steering assembly 102

At 702, the failure detection controller 126 may determine a first steering angle 132 associated with steering the machine 100. For example, in response to an operator steering the machine 100, command signals may be provided to actuators, controllers, etc. associated with extending and retracting the first cylinder rod 116 and the second cylinder rod 118, respectively. These command signals may also be associated with certain steering angles desired of the machine 100. For example, a first actuation of the first cylinder rod 116 may be associated with a first steering angle and a second actuation of the second cylinder rod 118 may be associated with a second steering angle. In some instances, a steering controller may receive inputs from an operator of the machine 100 and instruct the steering assembly 102 to steer by varying amounts.

At 704, the failure detection controller 126 may receive, from the first sensor, first data corresponding to the first steering angle 132 of the machine 100. In some instances, the first sensor may be disposed on a first side of the machine 100 or may be associated with the first cylinder rod 116. The first sensor may be arranged to measure a steering angle at a first side of the machine 100, such as a right hand side. In some instances, the first sensor may correspond to an angle sensor that measures a rotational movement of the first cylinder rod 116.

At 706, the failure detection controller 126 may determine the first measured steering angle 132 of the machine 100, at the first side of the machine 100. In some instances, the first measured steering angle 132 may be measured between the longitudinal axis 208 of the first cylinder rod 116 and the axis 214. For example, the first measured steering angle 132 may be measured to be 30 degrees.

At 708, the failure detection controller 126 may determine a difference between the first steering angle and the first measured steering angle 132. That is, a difference between the steering angles, as instructed and as measured, may be determined. In some instances, this difference may be used to monitor a health of the steering assembly 102 and/or for feedback loops. For example, from 708, the process 700 may loop to 702 for determining additional steering angles.

At 710, the failure detection controller 126 may determine, based at least in part on the first measured steering angle and kinematic data, an expected second steering angle. For example, the failure detection controller 126, using the first measured steering angle 132 and the kinematic data 136, may determine a predicted or expected steering angle associated with the second cylinder rod 118. In other words, in proper operation, throughout the range of steering, the first steering angles and the second steering angles may be associated with one another and certain steering angles may be expected. If the first measured steering angle 132 has a given angle, then if the steering assembly 102 is properly working (i.e., not broken), then the second steering angle 134 should have a known angle. If differences are determined, this may be indicative of the steering assembly 102 not functioning properly. The kinematic data 136 may indicate the expected second steering angle, based on a given input of the first measured steering angle 132.

At 712, the failure detection controller 126 may receive, from the second sensor, second data corresponding to a steering angle of the machine 100. In some instances, the second sensor may be disposed on a second side of the machine 100 or may be associated with the second cylinder rod 118. The second sensor may be arranged to measure a steering angle at a second side of the machine 100, such as a left hand side. In some instances, the second sensor may correspond to an angle sensor that measures a rotational movement of an end of the second cylinder rod 118.

At 714, the failure detection controller 126 may determine the second measured steering angle 134 of the machine 100, at the second side of the machine 100. For example, based on the second data, the failure detection controller 126 may determine the second measured steering angle 134. In some instances, the second steering angle 134 may be measured between the second longitudinal axis of the second cylinder rod 118 and the second axis along the second steering arm 122 (that corresponds to first axis 214).

At 716, the failure detection controller 126 may determine whether the expected second steering angle is different than the second measured steering angle 134. For example, the failure detection controller 126 may compare the second steering angle 134 with the expected second steering angle, as determined at 714. For example, if the expected second steering angle and the second measured steering angle 134 are within a certain threshold, this may indicate that the steering assembly 102 is functioning properly. However, if the second expected steering angle and the second measured steering angle 134 are not within a certain threshold, this may indicate that the steering assembly 102 is not functioning properly. As such, a determination of whether the expected second steering angle and the second measured steering angle 134 are different than may include a comparison of the difference to a threshold. If the difference is greater than a threshold amount, the process 700 may follow the "YES" route and proceed to 718.

At 718, the failure detection controller 126 may cause one or more actions to be performed. For example, as a result of determining that the second measured steering angle 134 and the expected second steering angle are different, the failure detection controller 126 may cause one or more actions to be performed. The one or more actions may be associated with preventing damage to the steering assembly 102 and/or notifying the operator of the potentially failed steering assembly 102.

As shown at 718, sub-operations 720 and/or 722 may be performed. For example, at 714, the failure detection controller 126 may cause output of an alert associated with a steering assembly. The failure detection controller 126 may communicate with the alert controller 138 for causing output of the alert 140. The alert 140 may be visual, tactile, audible, and/or any combination thereof. For example, the alert 140 may be output on a user interface of the machine 100, warning of the potentially failed components of the steering assembly 102. The alert 140 may therefore warn the operator as to the potentially failed steering assembly 102, which in turn, may cause the operator to power down the machine 100 to avoid further damage.

Additionally, or alternatively, at 722 the failure detection controller 126 may cause modification of a movement of the machine 100. For example, the failure detection controller 126 may communicate with the movement controller 142 for restraining or restricting a movement of the machine 100. For example, the movement controller 142 may apply brakes to stop a movement of the machine 100 and/or may power down an engine of the machine 100. The restraint provided by the movement controller 142 may prevent further damage to the machine 100 and/or the steering assembly 102.

Alternatively, if at 716 the difference is less than a threshold amount, the process 700 may follow the "NO" route and proceed to 724. At 724, the failure detection controller 126 may refrain from causing output of an alert associated with the steering assembly. For example, if the failure detection controller 126 determines that the difference between the second measured steering angle 134 and the expected second steering angle is less than the threshold difference, the failure detection controller 126 may determine that the steering assembly 102 is functioning properly. As a result, the failure detection controller 126 may refrain from alerting the operator and/or controlling movement of the machine 100. From 724, the process 700 may proceed to 702 whereby the failure detection controller 126 may receive additional sensor data for determining steering angles of the machine 100 and potential faults of the steering assembly 102.

Although the process 700 describes certain scenarios in which actions are performed in the event of a failure, the actions may be performed by additional operations. For example, if the sensors 128 report steering angles that are erratic or include intermittent behavior, the sensors 128 may be faulty. This may indicate that the sensors 128 and/or the steering assembly 102 has failed. Additionally, if signals from the sensors 128 are not received by the failure detection controller 126, or a constant output is received, this may indicate that the sensors 128 and/or the steering assembly 102 has failed. Additionally, although the process 700 illustrates comparison of the second measured steering angle 134 with that of an expected second steering angle, the process 700 may repeat for comparing the first measured steering angle 132 with that of an expected first steering angle.

In instances where the process 700 is performed by the remote system 144, or the remote system 144 determines the failure of the steering assembly 102, the remote system 144 may communicate with the machine 100 for instructing or otherwise controlling the machine 100. In other words, the machine 100 may be remotely controlled by the remote system 144 (or other system or device). In such instances, the remote system 144 may transmit signals to the machine 100 for performing various operations, such as raising and lowering the dump box 108, steering, accelerating the machine 100, and so forth. As it pertains to the instant application, the remote system 144 may transmit signals associated with braking the machine 100 or restraining a movement of the machine 100 in instances where the steering assembly 102 fails. Moreover, the remote system 144 may transmit the alerts to other third-parties associated with the failed steering assembly 102. As such, the remote system 144 may communicatively couple to the machine 100 for receiving sensor data 130 and making determinations as to the health of the steering assembly 102.

INDUSTRIAL APPLICABILITY

The present disclosure describes use of steering angle sensor systems and methods for steering control and determining failures, or more generally, a health of a steering assembly of a machine 100, such as mining machines (e.g., a mining truck). The machines 100 may be controlled locally (e.g., onboard operator) and/or remotely (e.g., remote operator). Determining the failure of the steering assembly provides several advantages, such as reducing repair time, costs, and/or additional damage being imparted to the machine 100.

The systems and methods disclosed herein allow for determining the health of the steering assembly on a continual basis by comparing steering angles of the machine 100. For example, sensor(s) may be disposed on or about the steering assembly, external to the cylinder rods. However, the sensor(s) (e.g., angle sensors) may operably couple to an end of the cylinder rods, for example, for determining the steering angles. Locating the sensor(s) external to the cylinder rods reduces repair time and cost, as well as a cost of manufacturing. For example, in instances where the sensors malfunction or break, requiring replacement, solely replacing the sensor, as compared to the cylinder rods, may be more cost effective. Moreover, the sensor(s) may include components that isolate unwanted vertical and/or rotational movements. For example, the sensor(s) may isolate vertical movements or roll movements of the cylinder rods imparted by a suspension system of the machine 100. By isolating these movements, the sensors may accurately measure the steering angles of the machine 100 for use in detecting faults.

Although the systems and methods of the machines 100 are discussed in the context of a mining truck, it should be appreciated that the systems and methods discussed herein may be applied to a wide array of machines and vehicles across a wide variety of industries, such as construction, mining, farming, transportation, military, combinations thereof, or the like. For example, the system or methods discussed herein may be implemented within any vehicle, machine, or equipment with wheels, such as a combine.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

The invention claimed is:

1. A machine, comprising:
a first steering arm coupled to a first wheel of the machine;
a second steering arm coupled to a second wheel of the machine;

a first cylinder extending between the first steering arm and a frame of the machine, actuation of the first cylinder causing first rotation of the first cylinder relative to the frame about a first rotational axis;

a second cylinder extending between the second steering arm and the frame, actuation of the second cylinder causing second rotation of the second cylinder relative to the frame about a second rotational axis;

a first angle sensor configured to sense a first angular displacement corresponding to the first rotation; and a second angle sensor configured to sense a second angular displacement corresponding to the second rotation.

2. The machine of claim 1, further comprising a first isolating mechanism coupled to the first cylinder and configured to rotate in response to the actuation of the first cylinder, rotation of the first isolating mechanism being sensed by the first angle sensor as the first angular displacement.

3. The machine of claim 2, wherein:
the actuation of the first cylinder results in a first movement of the first cylinder other than about the first rotational axis; and
the first isolating mechanism isolates the first rotation of the first cylinder from the first movement of the first cylinder.

4. The machine of claim 3, wherein the first isolating mechanism comprises a first toggle link including a first portion coupled to the first angle sensor and a second portion coupled to the first cylinder, the first portion being movable relative to the second portion to isolate the first rotation of the first cylinder from the first movement of the first cylinder.

5. The machine of claim 4, further comprising a first arm coupled to the first angle sensor, the first portion being coupled to the first angle sensor via the first arm, wherein the first arm pivots about the first rotational axis and the first angle sensor is configured to measure the pivot of the first arm.

6. The machine of claim 2, wherein:
the first cylinder extends along a first longitudinal axis; and
the first isolating mechanism couples to the first cylinder at a position along the first longitudinal axis.

7. The machine of claim 1, further comprising:
one or more processors; and
one or more non-transitory computer-readable media storing instructions that, when executed by the one or more processors, cause the one or more processors to perform operations comprising:
receiving, from the first angle sensor, first data corresponding to the first angular displacement;
receiving kinematic data associated with a kinematic relationship between the first cylinder and the second cylinder;
determining, based at least in part on the first angular displacement and the kinematic data, an expected second angular displacement;
receiving, from the second angle sensor, second data corresponding to the second angular displacement;
determining a difference between the second angular displacement and the expected second angular displacement; and
determining, based at least in part on a comparison of the difference to a threshold difference, whether a steering assembly of the machine is functioning properly.

8. The machine of claim 1, wherein:
the first angle sensor is disposed vertically above a point of rotation at which the first cylinder couples to the first steering arm; and
the second angle sensor is disposed vertically above a point of rotation at which the second cylinder couples to the second steering arm.

9. The machine of claim 1, wherein:
the first steering arm includes a first kingpin;
the first cylinder couples to the first steering arm via a first pin;
a first axis is disposed through a center of rotation associated with the first kingpin and a center of rotation associated with the first pin;
the first cylinder extends along a first longitudinal axis;
the first angular displacement is measured between the first axis and the first longitudinal axis;
the second steering arm includes a second kingpin;
the second cylinder couples to the second steering arm via a second pin;
a second axis is disposed through a center of rotation associated with the second kingpin and a center of rotation associated with the second pin;
the second cylinder extends along a second longitudinal axis; and
the second angular displacement is measured between the second axis and the second longitudinal axis.

10. A steering assembly, comprising:
a frame;
a first steering arm;
a second steering arm;
a first hydraulic actuator coupled to the frame and to the first steering arm, wherein actuation of the first hydraulic actuator causes the first steering arm to pivot relative to the frame and relative to the first steering arm;
a second hydraulic actuator coupled to the frame and to the second steering arm, wherein actuation of the second hydraulic actuator causes the second steering arm to pivot relative to the frame and relative to the second steering arm;
a first angle sensor disposed to measure a first rotational displacement of the first hydraulic actuator relative to the first steering arm;
a first link coupled at a first end to the first hydraulic actuator and coupled at a second end to the first angle sensor, the first end of the first link being moveable relative to the second end of the first link to isolate movements other than the first rotational displacement;
a second angle sensor disposed to measure a second rotational displacement of the second hydraulic actuator relative to the second steering arm; and
a second link coupled at a third end to the second hydraulic actuator and coupled at a fourth end to the second angle sensor, the third end of the second link being moveable relative to the fourth end of the second link to isolate movements other than the second rotational displacement.

11. The steering assembly of claim 10, wherein:
the first hydraulic actuator extends along a first longitudinal axis;
the second hydraulic actuator extends along a second longitudinal axis;
the first link couples to the first hydraulic actuator at a point along the first longitudinal axis; and
the second link couples to the second hydraulic actuator at a point along the second longitudinal axis.

12. The steering assembly of claim 10, further comprising:
a first arm coupling the first angle sensor to the first link; and
a second arm coupling the second angle sensor to the second link.

13. The steering assembly of claim 10, wherein:
the first link includes a first portion having the first end and a second portion having the second end, the first portion and the second portion being pivotably coupled together; and
the second link includes a third portion having the third end and a fourth portion having the fourth end, the third portion and the fourth portion being pivotably coupled together.

14. The steering assembly of claim 10, further comprising:
a first bracket disposing the first angle sensor above a top surface of the first steering arm; and
a second bracket disposing the second angle sensor above a top surface of the second steering arm.

15. A machine comprising:
a frame;
a first steering arm coupled to a first wheel of the machine;
a second steering arm coupled to a second wheel of the machine;
a first actuator coupled to a first side of the frame and the first steering arm;
a second actuator coupled to a second side of the frame and the second steering arm;
a first sensor configured to sense a first angular displacement associated with the first actuator;
a first isolating mechanism coupled to the first actuator and configured to rotate in response to an actuation of the first actuator, rotation of the first isolating mechanism being sensed by the first sensor as the first angular displacement;
a second sensor configured to sense a second angular displacement associated with the second actuator; and
a second isolating mechanism coupled to the second actuator and configured to rotate in response to an actuation of the second actuator, rotation of the second isolating mechanism being sensed by the second sensor as the second angular displacement.

16. The machine of claim 15, wherein:
the first isolating mechanism comprises a first toggle link that includes a first portion coupled to the first sensor and a second portion coupled to the first actuator, the first portion being movable relative to the second portion to isolate movement of the first actuator relative to the first sensor; and
the second isolating mechanism comprises a second toggle link that includes a third portion coupled to the second sensor and a fourth portion coupled to the second actuator, the third portion being moveable relative to the fourth portion to isolate movement of the second actuator relative to the second sensor.

17. The machine of claim 16, further comprising:
a first arm coupled to the first sensor, the first portion being coupled to the first sensor via the first arm, wherein the first arm pivots about a first axis and the first sensor is configured to measure the pivot for determining the first angular displacement; and
a second arm coupled to the second sensor, the third portion being coupled to the second sensor via the second arm, wherein the second arm pivots about a second axis and the second sensor is configured to measure the pivot for determining the second angular displacement.

18. The machine of claim 15, wherein:
the first actuator extends along a first longitudinal axis;
the second actuator extends along a second longitudinal axis;
the first isolating mechanism couples to the first actuator at a position along the first longitudinal axis; and
the second isolating mechanism couples to the second actuator at a position along the second longitudinal axis.

19. The machine of claim 15, wherein:
a first bracket couples to the first steering arm and disposes the first sensor above a top surface of the first steering arm; and
a second bracket couples to the second steering arm and disposes the second sensor above a top surface of the second steering arm.

20. The machine of claim 15, wherein:
the first steering arm includes a first axis of rotation;
the first actuator couples to the first steering arm via a first pin;
a first axis is disposed through the first axis of rotation and a center of rotation associated with the first pin;
the first actuator extends along a first longitudinal axis;
the first angular displacement is measured between the first axis and the first longitudinal axis;
the second steering arm includes a second axis of rotation;
the second actuator couples to the second steering arm via a second pin;
a second axis is disposed through the second axis of rotation and a center of rotation associated with the second pin;
the second actuator extends along a second longitudinal axis; and
the second angular displacement is measured between the second axis and the second longitudinal axis.

* * * * *